US011762085B2

(12) United States Patent
Steiner et al.

(10) Patent No.: US 11,762,085 B2
(45) Date of Patent: Sep. 19, 2023

(54) DEVICE, SYSTEM AND METHOD FOR LOCALIZATION OF A TARGET IN A SCENE

(71) Applicant: Sony Corporation, Tokyo (JP)

(72) Inventors: Maximilian Steiner, Ulm (DE); Christian Waldschmidt, Ulm (DE)

(73) Assignee: SONY CORPORATION, Tokyo (JP)

(*) Notice: Subject to any disclaimer, the term of this patent is extended or adjusted under 35 U.S.C. 154(b) by 208 days.

(21) Appl. No.: 17/042,188

(22) PCT Filed: Mar. 27, 2019

(86) PCT No.: PCT/EP2019/057765
§ 371 (c)(1),
(2) Date: Sep. 28, 2020

(87) PCT Pub. No.: WO2019/185739
PCT Pub. Date: Oct. 3, 2019

(65) Prior Publication Data
US 2021/0026006 A1    Jan. 28, 2021

(30) Foreign Application Priority Data
Mar. 29, 2018 (EP) .................................... 18165047

(51) Int. Cl.
G01S 13/87 (2006.01)
G01S 13/44 (2006.01)
G01S 13/46 (2006.01)

(52) U.S. Cl.
CPC ........ *G01S 13/878* (2013.01); *G01S 13/4418* (2013.01); *G01S 13/46* (2013.01);
(Continued)

(58) Field of Classification Search
CPC .... G01S 13/878; G01S 13/4418; G01S 13/46; G01S 13/872; G01S 2013/466; G01S 2013/468
See application file for complete search history.

(56) References Cited

U.S. PATENT DOCUMENTS 6,522,288 B1 * 2/2003 Paradie .................. G01S 13/46
342/146
2005/0140540 A1 6/2005 Rees et al.
(Continued)

FOREIGN PATENT DOCUMENTS

EP   3032276 A1 * 6/2016   .......... G01S 13/003
EP   3032276 A1   6/2016

OTHER PUBLICATIONS

International Search Report and Written Opinion dated Jul. 10, 2019 for PCT/EP2019/057765 filed on Mar. 27, 2019, 11 pages.
(Continued)

Primary Examiner — Peter M Bythrow
Assistant Examiner — Nazra Nur Waheed
(74) Attorney, Agent, or Firm — XSENSUS LLP

(57) ABSTRACT

A device comprising circuitry configured to: obtain radar signal measurements simultaneously acquired by two or more radar sensors having overlapping fields of view, derive range information of one or more potential targets from samples of radar signal measurements of said two or more radar sensors acquired at the same time or during the same time interval, the range information of a single sample representing a ring segment of potential positions of a potential target at a particular range from the respective radar sensor in its field of view, determine intersection points of ring segments of the derived range information, determine a region of the scene having one of the highest densities of intersection points, select a ring segment per sensor that goes through the selected region, and determine the most likely target position of the potential target from the derived range information of the selected ring segments.

19 Claims, 13 Drawing Sheets

(52) U.S. Cl.
CPC ....... *G01S 13/872* (2013.01); *G01S 2013/466* (2013.01); *G01S 2013/468* (2013.01)

(56) References Cited

U.S. PATENT DOCUMENTS

| | | | |
|---|---|---|---|
| 2007/0005292 A1 | 1/2007 | Jin | |
| 2007/0222664 A1* | 9/2007 | Perl | G01S 13/872 342/29 |
| 2010/0150117 A1* | 6/2010 | Aweya | G01S 5/14 370/338 |
| 2011/0025494 A1 | 2/2011 | Adcook et al. | |
| 2011/0267221 A1* | 11/2011 | Brundick | G01S 13/02 342/180 |

OTHER PUBLICATIONS

Ahmad, F. and Amin, M. G., "Noncoherent Approach to Through-the-Wall Radar Localization," IEEE Transactions on Aerospace and Electronic Systems, vol. 42, No. 4, Oct. 2006, pp. 1405-1419.

Oprisan, D. and Rohling, H., "Tracking Systems for Automotive Radar Networks," Institute of Electrical Engineers, London, 2002, pp. 339-343.

Qill, H., et al., "The Geo-n Localization Algorithm," 2012 International Conference on Indoor Positioning and Indoor Navigation, Nov. 13-15, 2012, 10 pages.

\* cited by examiner

DEVICE, SYSTEM AND METHOD FOR LOCALIZATION OF A TARGET IN A SCENE

CROSS-REFERENCE TO RELATED APPLICATIONS

The present application is based on PCT filing PCT/EP2019/057765, filed Mar. 27, 2019, which claims priority to EP 18165047.4, filed Mar. 29, 2018, the entire contents of each are incorporated herein by reference.

BACKGROUND

Field of the Disclosure

The present disclosure relates to a device, a corresponding method and a system for localization of a target in a scene.

Description of Related Art

An accurate localization of targets by radar, e.g. within a vehicle's environment, requires, inter alia, a high separability in range as well as in the angular domain to enable the differentiation between closely adjacent targets.

Radar sensors that utilize beam forming or beam steering of the antenna pattern for the purpose of target localization or imaging are widely used. Beam forming or beam steering can be achieved electronically or by mechanical movement. The electronic approaches for beam forming combine signals from small antennas into an array pattern with a higher directivity than a single antenna by coherence of the signals of all antennas. The performance of such systems is mainly characterized by the range and angle separability. The total aperture of the antenna array determines the angular separability. The inter antenna distance of the array needs to be less than half the free space wavelength to allow a spatially unambiguous localization of targets with restriction to the beamwidth. Due to this limitation, a certain number of antenna elements and signal processing channels is necessary to achieve a desired separability. Beam forming sensors are only able to cover a limited field of view. Therefore, a large number of these complex radar sensors would be required to cover 360° of an object's environment.

A further possibility for high-resolution target localization is the approach of multiple spatially distributed radar sensors with a joint data processing. Hereby, a high separability can be achieved, especially for close targets. For such systems, no typical beam forming can be applied, as coherent coupling of spatially distributed sensors is very expensive. Hence, in contrast to complex beam forming sensors, the single sensors of a distributed system can be very simple and low cost, as no angle information needs to be estimated. Therefore, the number of signal processing channels (including antennas) can be reduced up to a single channel per sensor. In real scenarios the localization within a network of distributed sensors by multilateration is typically ambiguous, due to a limited number of sensors facing a much larger number of radar targets. This makes a more advanced approach desirable to reduce or avoid these ambiguities, which are accompanied with multilateration algorithms.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a device, a corresponding method and a system for localization of a target in a scene with higher preciseness and fewer ambiguities.

According to an aspect there is provided device for localization of a target in a scene, said device comprising circuitry configured to:
  obtain radar signal measurements simultaneously acquired by two or more radar sensors arranged at different locations, said two or more radar sensors having overlapping fields of view,
  derive range information of one or more potential targets from samples of radar signal measurements of said two or more radar sensors acquired at the same time or during the same time interval, the range information of a single sample representing a ring segment of potential positions of a potential target at a particular range from the respective radar sensor in its field of view,
  determine intersection points of ring segments of the derived range information,
  determine a region of the scene having one of the highest densities of intersection points,
  select a ring segment per sensor that goes through the selected region, and
  determine the most likely target position of the potential target from the derived range information of the selected ring segments.

According to a further aspect there is provided a corresponding method for localization of a target in a scene.

According to a still further aspect there is provided a radar system for localization of a target in a scene comprising:
  two or more radar sensors arranged at different locations and having overlapping fields of view from the scene, said radar sensor being configured to simultaneously acquire radar signal measurements from the scene including one or more targets, and
  a device as disclosed herein for localization of a target in the scene based on the acquired radar signal measurements.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed method, the disclosed system, the disclosed computer program and the disclosed computer-readable recording medium have similar and/or identical further embodiments as the claimed device and as defined in the dependent claims and/or disclosed herein.

One of the aspects of the disclosure is to make use of a system concept and a signal processing approach, which enable the localization of one or more (stationary or moving) radar targets in scene view from a (stationary or moving object) that is equipped with two or more radar sensors. For instance, one or more targets in a 360° surrounding of the object shall be localized, especially in scenarios with relative movement between the utilized sensors and the targets. In an practical application the object may a vehicle, such as a car driving on the street or a robot moving around in a factory, and the targets may be other vehicles, persons, buildings, machines, etc.

Multiple distributed single-channel radar sensors can be used instead of a single multi-channel sensor. This enables a large spacing between the single sensors. Hereby, an ambiguous target position can be estimated by means of a multilateration algorithm. The problem of ambiguities can further be countered in an embodiment by joint evaluation of the range and the velocity information that is provided by every single sensor.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
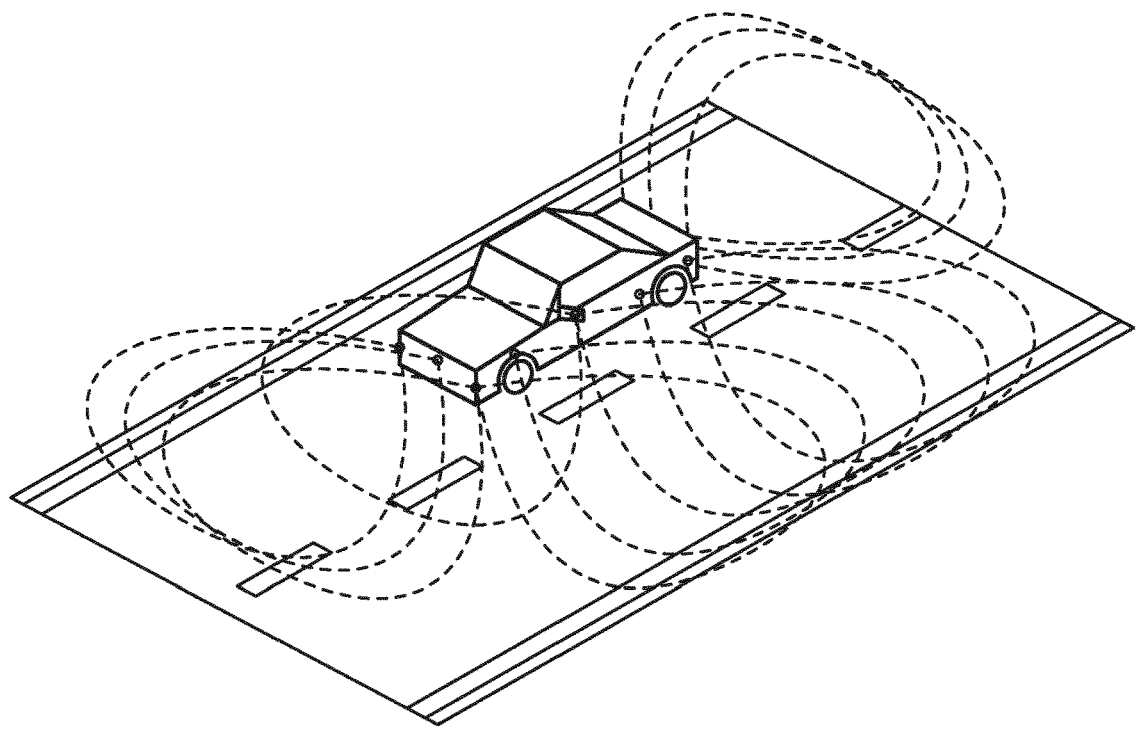
FIG. 1 shows a diagram illustrating an exemplary application scenario of the disclosed device, system and method.

Referring now to the drawings, wherein like reference numerals designate identical or corresponding parts throughout the several views, FIG. 1 shows a diagram illustrating an exemplary application scenario of the disclosed device and method. The disclosed system generally comprises multiple (at least two) single radar sensors, which are arranged around an object's contour so that much of the respective radiation patterns overlap. In the scenario shown in FIG. 1 multiple radar sensors are arranged around a car so that the single antenna patterns overlap at three (or four) sides of the car. These single radar sensors have an extremely low complexity, and hence their capabilities are limited to the determination of a target's distance and relative velocity. Due to the small number of channels or antennas, only a rudimentary or even no possibility exists for angle estimation by a single radar sensor in comparison to radar sensors with array antenna, the use of which shall, however, be avoided or which are not available according to the present disclosure.

Figure 2:
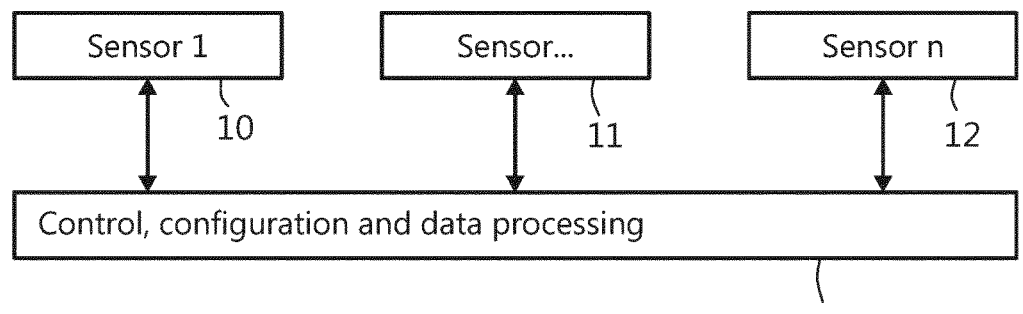
FIG. 2 shows a schematic diagram of a first embodiment of a system according to the present disclosure.

Every single sensor performs radar measurements independent of the other sensors so that no direct phase synchronization between the sensors is necessary. The exact time of a measurement may be determined by an external trigger signal or may be otherwise known with high accuracy. The control and configuration may be ensued by a central unit 20, as shown in FIG. 2 illustrating a first embodiment of a system 1 according to the present disclosure comprising n (here three) radar sensors 10, 11, 12 and the central unit 20, representing or including a localization device for localization of a target in a scene disclosed herein. The central unit 20 may be implemented in software, or hardware or a combination of soft- and hardware, e.g. through a computer program or application running on a correspondingly programmed computer or processor. The central may not only perform processing of the acquired radar signals, but also control and configuration operations.

Figure 3:
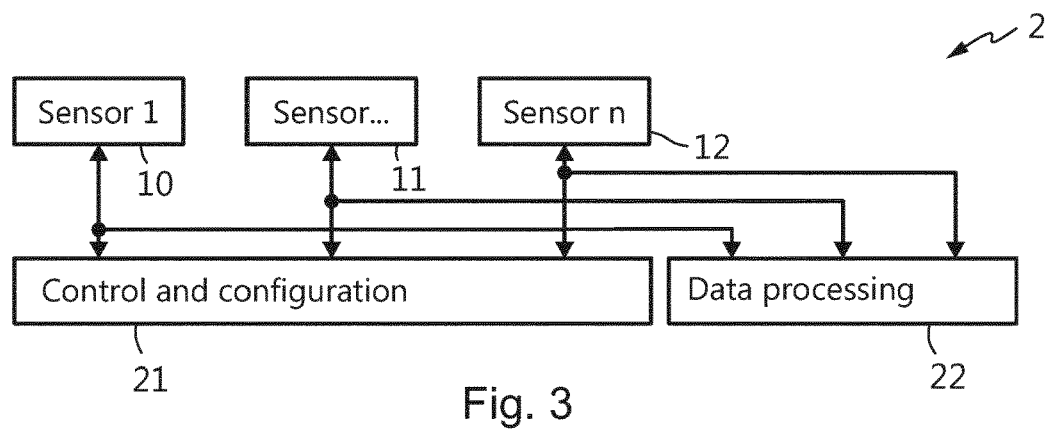
FIG. 3 shows a schematic diagram of a second embodiment of a system according to the present disclosure.

FIG. 3 shows a schematic diagram of a second embodiment of a system 2 according to the present disclosure, in which the tasks of control and configuration operation are performed in a control unit 21 and the task of signal processing of the radar signals is performed in a processing unit 22, which represents or includes a localization device for localization of a target in a scene disclosed herein. Both the control unit 21 and the processing unit 22 may be implemented in soft- and/or hardware. The obtained raw data of every single sensor 10, 11, 12 may thus directly or after preprocessing transferred to a central processing unit 20 or 22, respectively.

The signal processing utilizes a multilateration approach, which uses the measured distance, optionally in combination with an approach that uses the measured relative velocity between the sensors and the target(s) to estimate the position (angle and distance relative to the sensors) of the target(s). The relative velocity can be estimated by each sensor due to the Doppler frequency shift of the reflected signal. This information, as well as the target's distance is different for each particular sensor for a common target. This enables the derivation of a target's angle in relation to the sensor base line, due to the correlation of the different relative velocities and ranges between a target and each particular sensor. In addition, the estimation of a target's movement within a single measurement cycle is possible by virtue of the possible large spacings between the sensors, which cover a common target.

Basically four different scenarios are conceivable:
It exists no movement in the scene;
only the sensor platform is moving;
only single targets move within the scene; and
the sensor platform and single targets have an arbitrary movement.

Figure 4:
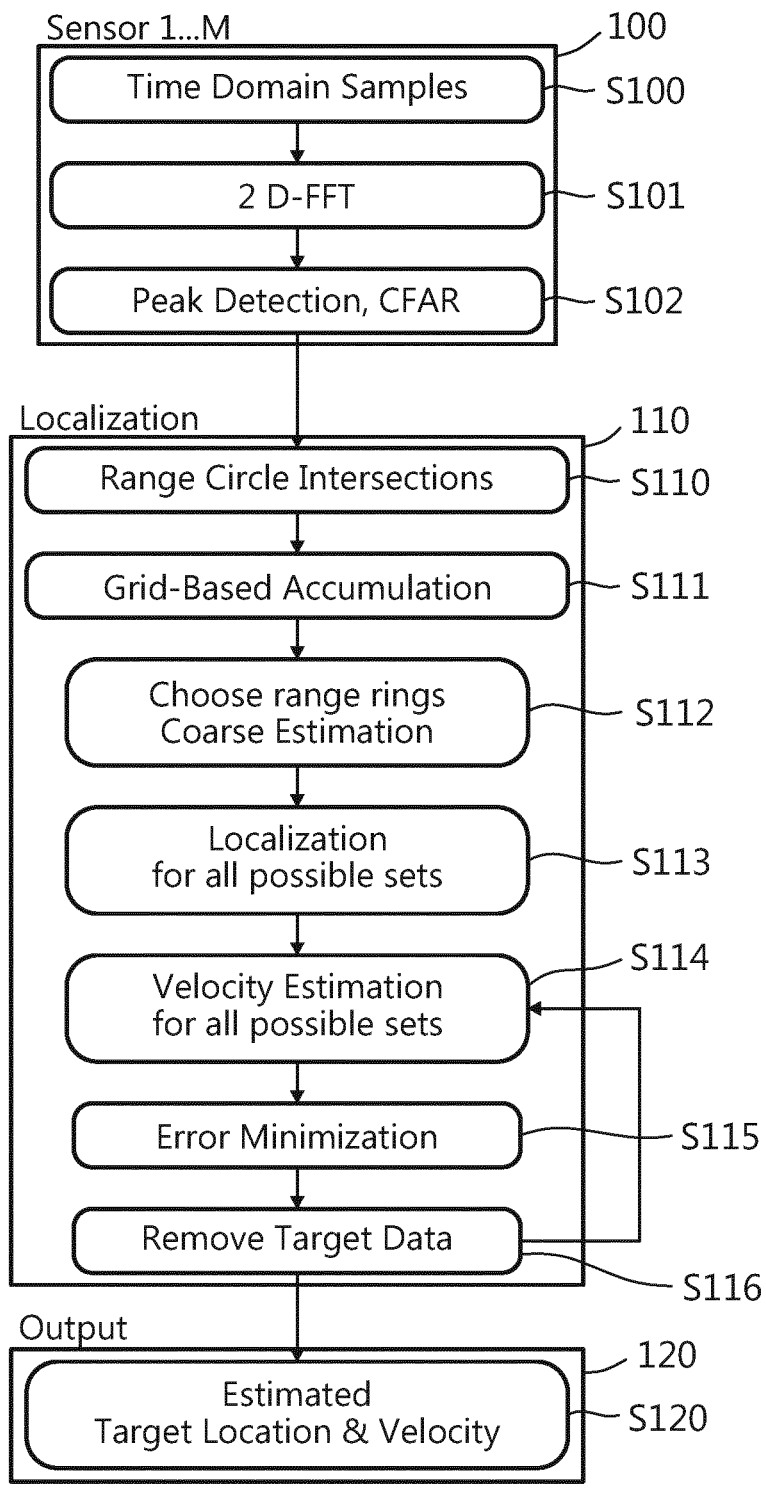
FIG. 4 shows a flowchart of an embodiment of a method according to the present disclosure.

FIG. 4 shows a flowchart of an embodiment of a method according to the present disclosure. For this embodiment it is assumed that there are moving targets and/or a moving sensor platform. The data flow can be divided into three layers:

1. Data acquisition and pre-processing 100: The data of at least three radar sensors, which cover a common field of view, are sampled simultaneously (S100). In case of chirp-sequence radars, this data set consists of the time-domain samples, from which the range and velocity information of radar reflections within the field of view can be estimated by e.g. two Fourier transformations (S101). A subsequent target extraction algorithm (CFAR—constant false alarm rate) can be used to reduce the amount of data to be transferred to a certain number of radar targets (S102).

2. Localization algorithm 110:
   a. In a first step (S110), the detected ranges of all single sensors are linked together by bilateration. The range information of each radar target results in a ring of ambiguous positions around the particular sensor position, the intersections of two rings of different sensors result in candidates for the actual target position with a lowered ambiguity. Additional intersections of range rings of different targets lead to intersection points at wrong positions.
   b. These pairwise intersection points of all range rings are accumulated (S111) into a common grid to determine clusters with high densities of intersection points. Therefore, copies of the intersection-matrices are shifted against each other and accumulated.
   c. Subsequent to the grid-based accumulation, the highest intersection density cell is searched (S112) and all range rings that cross through a certain confidence region around the maximum density cell are selected for further processing.
   d. The most likely target position is iteratively searched (S113, S115) in consideration of all possible combinations of range rings of the involved sensors. Therefore, the range information is supplemented with the velocity information related to each range ring and the most likely target position evaluated (S114).
   e. The range rings related to a targets position are removed from the dataset (S116), after localization has succeeded and the dataset is fed back to step c. Here, the new density maximum of the intersection point distribution is selected and further target positions are extracted iteratively.

3. Output (120): The algorithm stops after all possible targets are found (S120). Hence, the position, the velocity and the direction of movement for each target may be estimated.

In comparison to single radar sensors, which are based on phased-array antennas, the use of distributed sensors within the described concept is advantageous to the localization accuracy due to the large possible spacing. The actual scenario affects directly the localization accuracy. Particularly, the number of targets, the relative velocities, and the directions of movement have an impact on the performance.

Failures of single or multiple sensors do not necessarily lead to a total failure of the system, but merely to a degradation of the performance regarding the localization accuracy, detection probability or limitations to the field of view.

The measured relative velocities between a target and each sensor differ according to the possibly wide distribution of the sensors. This allows improving the localization by correlation of the velocities and the range information and enables the determination of a targets velocity and direction of movement within a single measurement cycle. Hence, no tracking of targets over multiple measurement cycles is necessary according to this concept in contrast to single sensors with array-antennas.

In the following more details of the steps of the disclosed method and of embodiments of the disclosed device, system and method will be provided.

According to an embodiment a network of non-coherent single channel radar sensor nodes is utilized to estimate the position and motion of multiple targets. Therefore, simultaneous snapshot measurements of sensor nodes covering a common field of view are evaluated for a single algorithm run. Every single sensor performs radar measurements, independent of the other sensors, so that no direct phase synchronization between the sensors is necessary. The exact time of a measurement is either determined by an external trigger signal or otherwise known with high accuracy. The control aid configuration may be carried out by a central unit. The obtained raw data of every single sensor is directly, or after preprocessing, transferred to a central processing unit.

Figure 5:
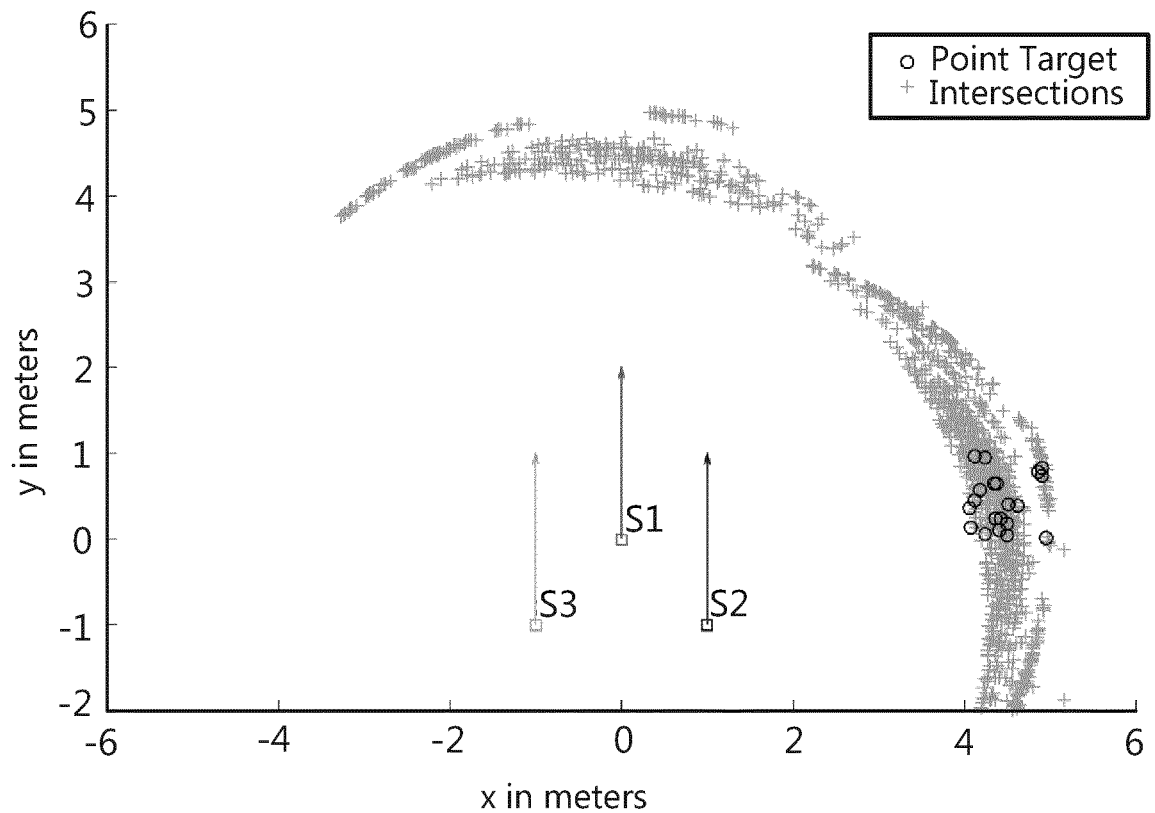
FIG. 5 shows a diagram illustrating an exemplary scenario with four stationary radar sensors and four moving targets.

Automotive radar scenarios exhibit large numbers of targets distributed over the complete field of view. Hence, ambiguities arise for localization approaches based only on the radial range information. An example for this is given in FIG. 5 showing a diagram of a simulation of an extended target consisting of 20 point scatterers detected by three sensors S1, S2 S3 with all possible pair-wise intersection points. The problem of ambiguous target positions can be resolved in scenarios with movement by a joint processing of the range- and and the radial velocity information, whereby also the localization accuracy can be improved.

Moving objects in a scenario result in a Doppler shift in the frequency domain, that is measured by a radar. This Doppler shift conforms to the velocity relative to the radar. Automotive scenarios can be split up in three different cases regarding their movement:

1. Sensors are moving with velocity $v_{ego}>0$ and targets are stationary.
2. Sensors are stationary and targets are moving with velocity $v_{tar}>0$.
3. Sensors and targets are moving with velocities $v_{ego}>0$ and $v_{tar}>0$.

These cases are considered in the following.

Figure 6:
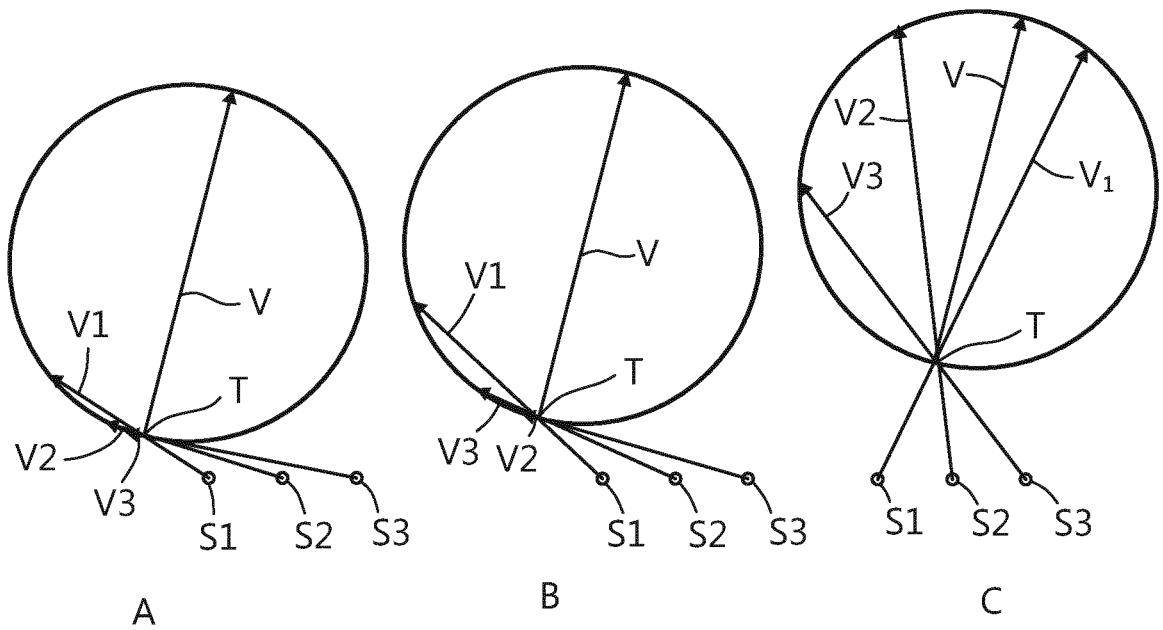
FIG. 6 shows a diagram illustrating the relation between target position and measured relative velocity at three sensors.

First, the first case of moving sensors shall be considered. The proper motion of a vehicle with mounted sensors leads to relative velocities that are measured by a radar sensor. The measured relative velocities of a stationary target are dependent on the angle a target appears in, relative to the direction of motion. These relative velocities differ as the angle between the common target position and each respective sensor differs due to the spatial distribution of the sensors. The relationship between the target-sensor angles, the relative velocities and the actual movement need to fulfil Thales' theorem. Hence, it can be illustrated by a circle whose diameter is determined by the actual velocity, as depicted in FIG. 6 for different target positions shown in FIGS. 6A-6C. The velocity vector V is related to the common motion of the sensors S1-S3, even though it is drawn at the target position T which is the common origin of the relative velocities. The vectors V1, V2, V3 represent the angular decomposition of the actual sensor motion and must end up on the circle with respect to the angle between the target T and each sensor S1-S3, under the assumption that all sensors experience a movement in the same direction and all observations belong to a common target. The drawn vectors are inverse to the measurement of the sensors.

This principle is also depicted in FIG. 7 for a single sensor, which is moving linearly along the y-axis. This may be a scenario of a moving vehicle with mounted radar sensor and different stationary targets. If the ego velocity of the sensor-carrying vehicle is known, the measured relative velocity of stationary targets can be used for the determination of the angle between the direction of movement and the target position. The relation between the angle (θ) and the measured relative velocity ($v_{rel}$) in dependence of the ego velocity ($v_{ego}$) is given by $$\theta = \arccos\left(\frac{v_{rel}}{v_{ego}}\right). \tag{1.1}$$

Figure 7A:
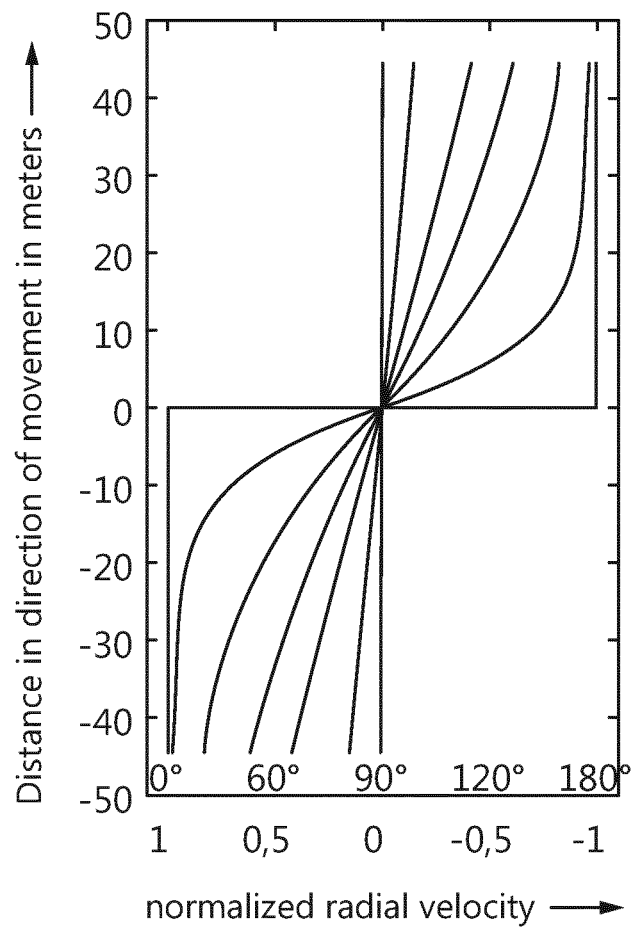
FIG. 7A shows a diagram illustrating the relation between the normalized radial velocity and the distance in the vehicle's direction of movement.
Figure 7B:
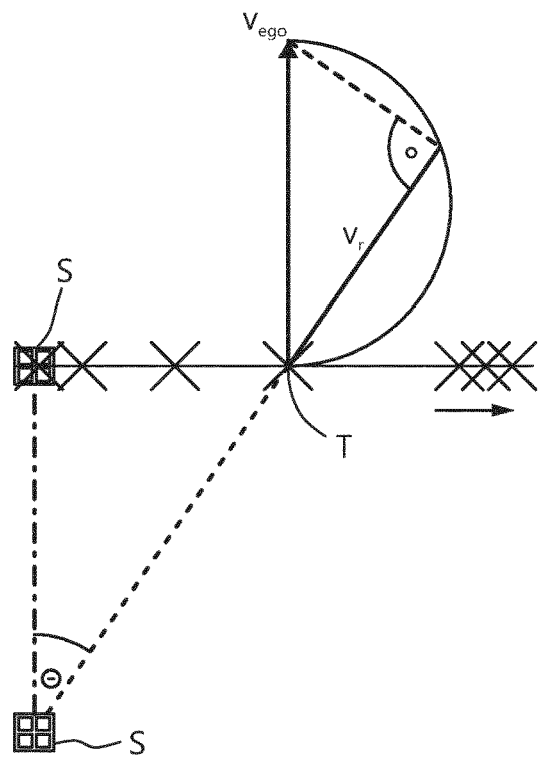
FIG. 7B shows a diagram illustrating a snapshot of a scenario with a forward moving sensor and the resulting velocity vectors projected to a possible target's position.

In FIG. 7A graphs of the target angle over the distance in direction of movement are given for different target positions, showing that different target angles clearly can be separated due to the movement. Particularly the relation between the normalized radial velocity measured by the radar and the distance in the vehicle's direction of movement is depicted in FIG. 7A. FIG. 7B shows a snapshot of a scenario with a forward moving sensor S and the resulting velocity vectors projected to a possible target's position. A single radar sensor allows estimating the ambiguous angle of a target position. This ambiguity occurs symmetrical to the axis of movement, as the relative velocity does not allow a clear distinction here. A remedy for that restriction is the usage of multiple widely distributed radar sensors to achieve a clearer estimation of a targets location.

Figure 8:
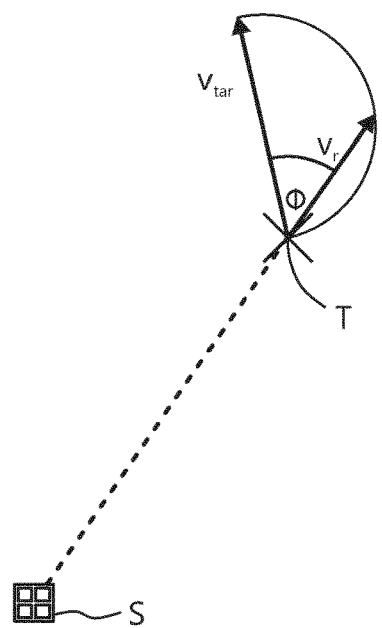
FIG. 8 shows a diagram illustrating the velocity relation between the measured relative velocity and the target movement for a stationary sensor.

Next, the second case of moving targets shall be considered. In contrast to the first case, here the sensors are assumed to be stationary while the targets are moving. The velocity relation between the measured relative velocity and the target movement is depicted in FIG. 8. It can be observed that a single sensor is not sufficient to determine a targets velocity and its direction of motion, but the different relative velocities provided by spatially distributed sensors enable an instantaneous estimation of the actual target motion.

Figure 9:
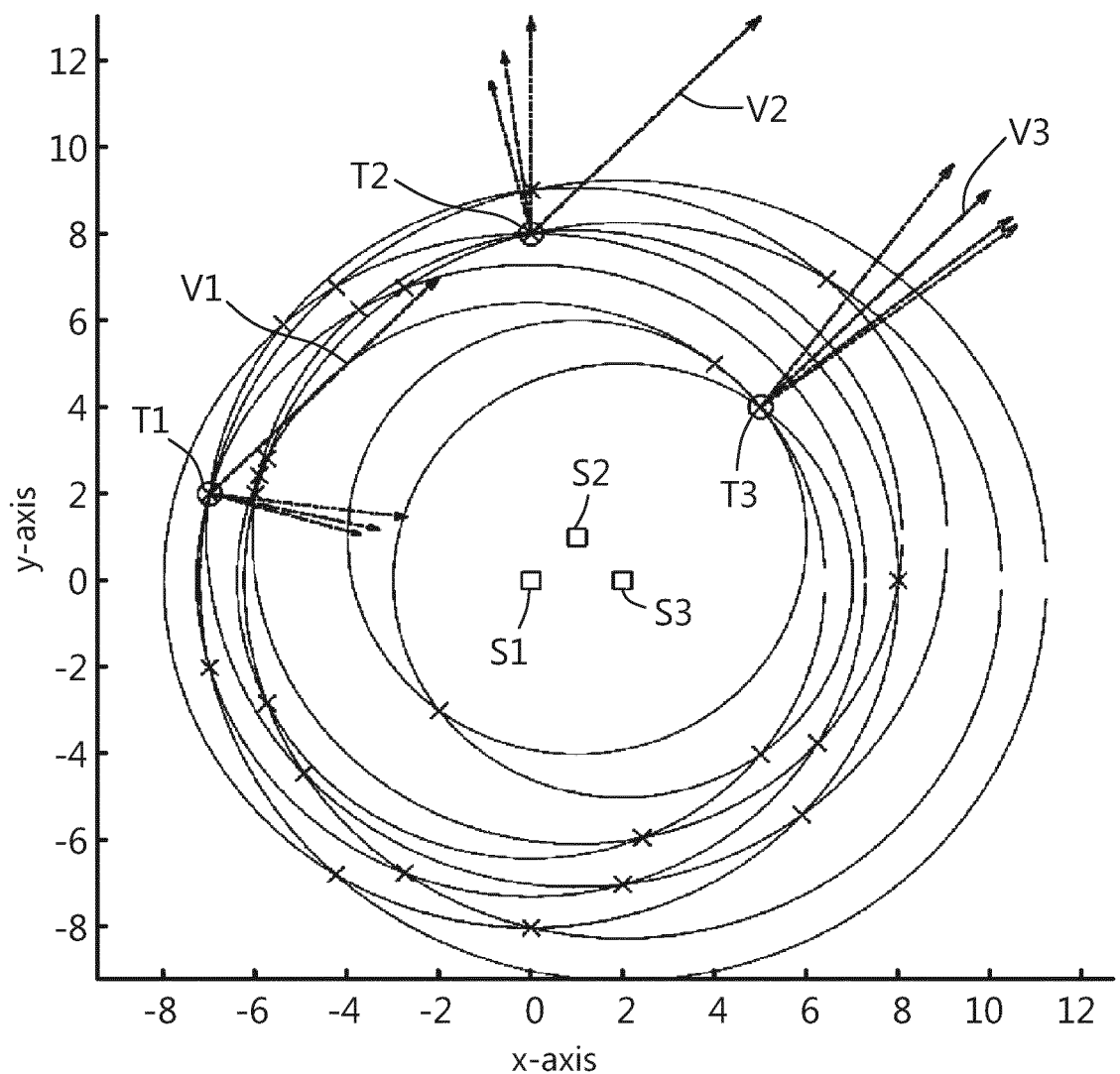
FIG. 9 shows a diagram illustrating an exemplary scenario with three stationary sensors and three moving targets.

An exemplary scenario with three stationary sensors and three moving targets is depicted in FIG. 9. The plot shows the ideal multilateration utilizing three sensors S1-S3 for the localization of three moving targets T1-T3. At every target position the actual velocity indicated by the arrows V1, V2, V3 as well as the resulting radial velocities (indicated by the other arrows) are drawn regarding the respective sensor. Additionally, crosses mark all points of intersections between two range rings. In the example shown in FIG. 9 no measurement errors are present.

Figure 10:
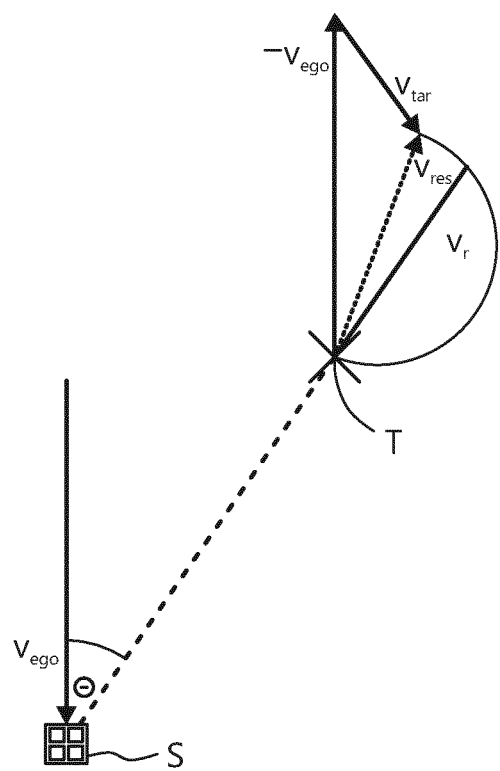
FIG. 10 shows a diagram illustrating the velocity relation between the measured relative velocity and the target movement for moving sensor and moving target.

Next, the third case of moving targets and moving sensors shall be considered. The third case comprises a movement of the sensors and a movement of the targets, which is superimposed in view of the measurement. An exemplary depiction of this behavior is given in FIG. 10. Here, the transposed velocity of the sensor motion $v_{ego}$ is superimposed by the motion of the target $v_{tar}$ resulting in $v_{res}$ which is measured by the sensor. In this case, the velocity $v_{res}$ can be determined by utilizing the simultaneous measurements of at least three spatially distributed sensors as shown in FIG. 6.

The actual target movement (direction and velocity) can be determined by additionally using the ego-motion of the sensors. This information might be available from other systems or sensors build in a car, like wheel speed sensors or the odometer. It can also be derived from stationary targets, as they provide a common velocity behavior reflecting the actual motion of the car. Such a method is related to the second case explained above with reference to FIG. 8.

The disclosed concept may utilize multiple spatially distributed radar sensor nodes for mid-range sensing application in scenarios that involve a relative movement between sensors and targets. In particular, at least two radar sensors spatially distributed and loosely coupled may be utilized. Each sensor independently performs a radar measurement resulting in range and velocity information of detected targets. Simultaneous measurements are assumed so that all sensors observe a target at the same time.

The technique of multilateration enables the localization of targets by exploitation of the range information measured by several sensor nodes. Hereby a common scattering point is assumed and the intersection of all range rings is required. However, in real scenarios, targets are likely extended which leads to multiple scattering points distributed over a target's contour instead of a common scattering point. Therefore, not more than two range circles traverse a single intersection point. This behavior changes with varying spatial distances between the sensor nodes due to different angles of incidence at the target.

Figure 11:
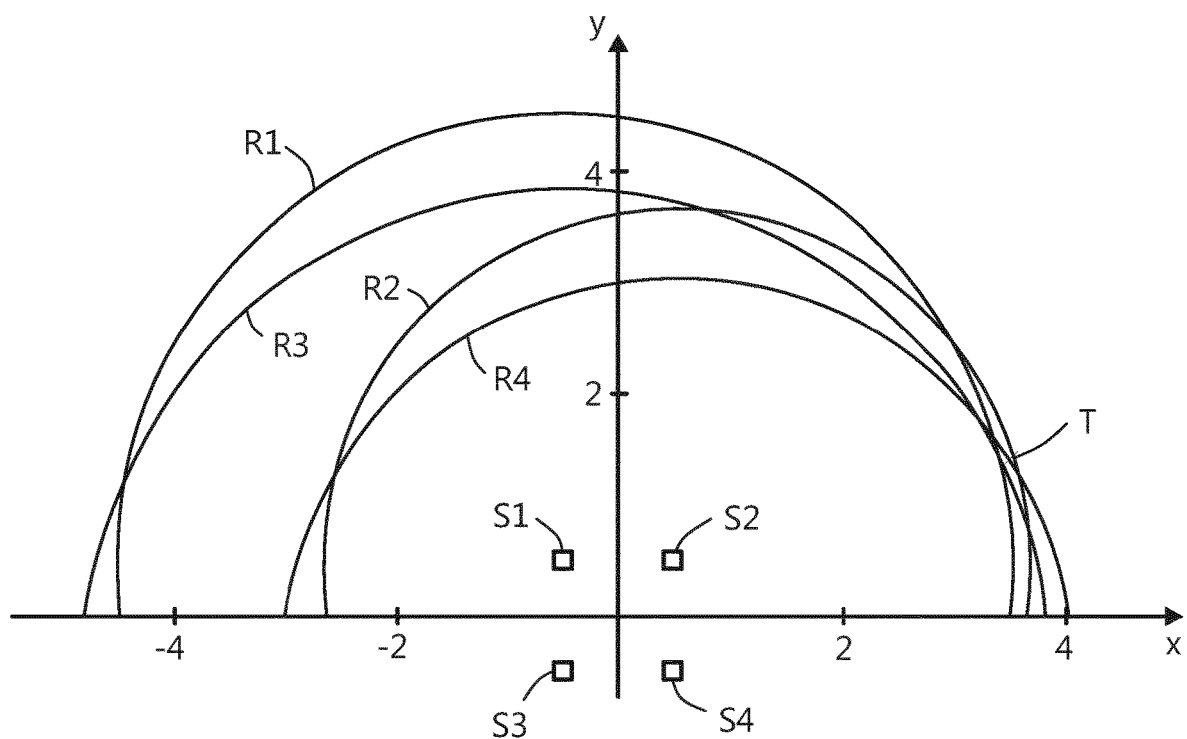
FIG. 11 shows a diagram illustrating an exemplary scenario with non-ideal range measurements around a single target.

An exemplary scenario with non-ideal range measurements around a single target T is depicted in FIG. 11. It shows how pair-wise intersection points of the range rings R1-R4 scattered around the target position and additional "ghost" intersection points. The number of resulting points around the position of a single target $$n_t = \frac{M!}{(M-2)!} \tag{1.2}$$

is determined by the number of sensor nodes M, assuming a single reflection per sensor at the target. Additional intersections occur at different positions, where probably no target is present.

Therefore the number of targets T determines the total number of intersection points $$n_{scene} = \frac{M! \cdot T^2}{(M-2)!}. \tag{1.3}$$

In scenarios with many more targets than sensors, the number of intersection points not representing the target position become predominant what results in ambiguous target positions like clusters of intersection points.

An embodiment of the disclosed algorithm utilizes the range and relative velocity information that is gathered by the sensor nodes to estimate the position, absolute velocity and direction of movement. The flowchart shown in FIG. 4 depicts the consecutive processing steps, which will now be explained in more detail.

The sensor nodes may operate with the chirp-sequence modulation scheme that allows the measurement of ranges and of the RF-signals Doppler-shift. The time domain data is processed by a two-dimensional Fourier transform resulting in range and velocity data. Targets are extracted from this data by CFAR algorithms, so that a list of detected targets with their corresponding relative velocities is available for each sensor node.

The following description is done in a two-dimensional space. With a view on single sensors data, the detected target ranges are ambiguous on a circle around the sensor position with a radius of the detected range. In the first step (S110 "Range Circle Intersection") of joint data processing (110), a lateration technique is used. Thereby, the pairwise cross-section points $$\vec{S}_{1,2} = S_{1/2,x} \cdot \vec{e}_x + S_{1/2,y} \cdot \vec{e}_y \quad (1.4)$$

are calculated between two circles with the different center points $$\vec{P}_i = P_{i,x} \cdot \vec{e}_x + P_{i,y} \cdot \vec{e}_y \quad (1.5)$$

for the ranges $r_i$ and $r_j$. Therefore, the distance $|P_i P_j|$ between two sensor nodes can be calculated to $$|P_i P_j| = \sqrt{(P_{j,x} - P_{i,x})^2 + (P_{j,y} - P_{i,y})^2} \quad (1.6)$$

and the angle $$\Phi = \arccos\left(-\frac{\left(r_j^2 - r_i^2 - |\overrightarrow{P_I P_J}|^2\right)}{2 \cdot r_i \cdot |\overrightarrow{P_I P_J}|}\right) \quad (1.7)$$

between the node connecting line and a intersection. With $$\alpha 1,2 = \arctan2\left(\frac{P_{j,y} - P_{i,y}}{P_{j,x} - P_{i,x}}\right) \pm \Phi \quad (1.8)$$

the two points are calculated to $$x1,2 = P_{i,x} + r_i \cdot \cos(\alpha_{1,2}) \quad (1.9)$$

$$y1,2 = P_{i,y} + r_i \cdot \sin(\alpha_{1,2}). \quad (1.10)$$

Two distinct intersection points exist for overlapping range circles, while two tangent circles result in a single point of intersection.

The number of intersection points per target $n_t$ is given by equation 1.2, if the target is detected by M sensor nodes. Therefore, the $n_t$ intersection points with the most probable relation to the same target need to be found as starting point for the iterative algorithm. For this reason, the two-dimensional spatial density distribution of pair-wise intersection points is determined.

Figure 12:
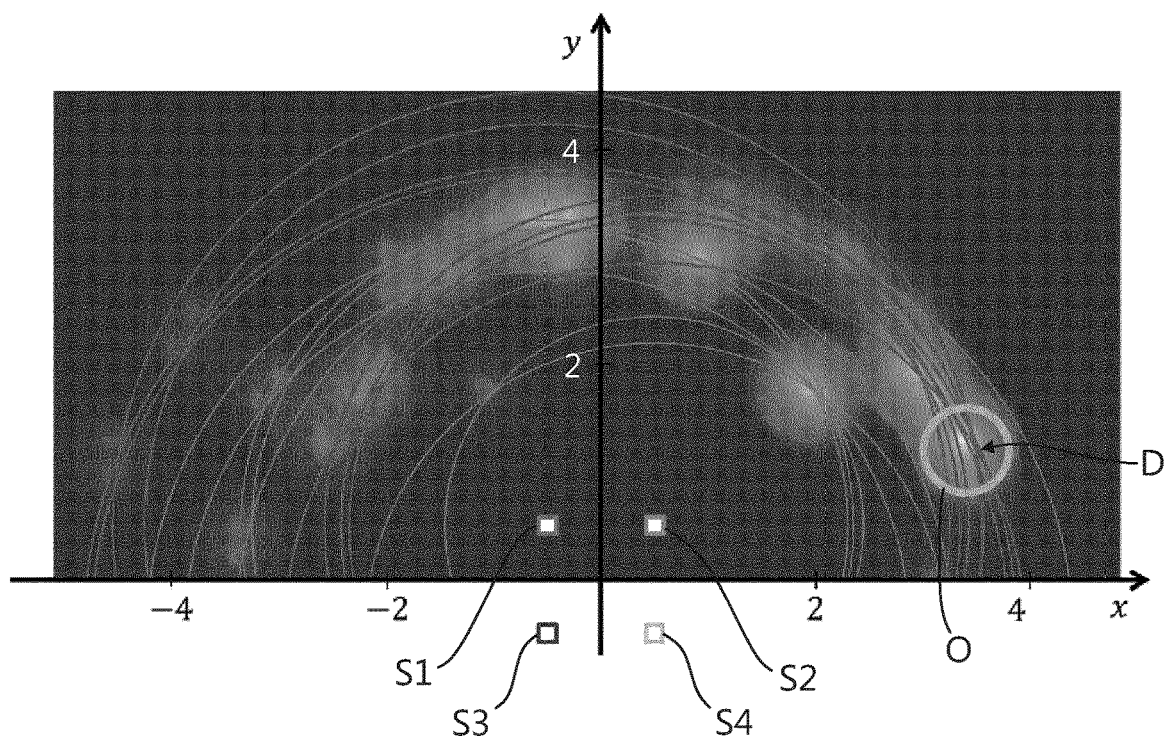
FIG. 12 shows a diagram illustrating a range-ring intersection density.

This can for example be done by an accumulation (step S111) of the intersection points to multiple grids with spatial offset, which are merged afterwards. The size of the grid cells has to be chosen considerably larger than the range resolution that is performed by a sensor node. To circumvent the limitation of the accumulation to consider only points, lying within the borders of a grid cell, the accumulation can be accomplished at multiple grids that are spatial shifted in the x and y dimension by half of the grid size. FIG. 12 depicts the density distribution of the range ring (also called ring segment) intersection points from the exemplary scenario depicted in FIG. 13.

Figure 13:
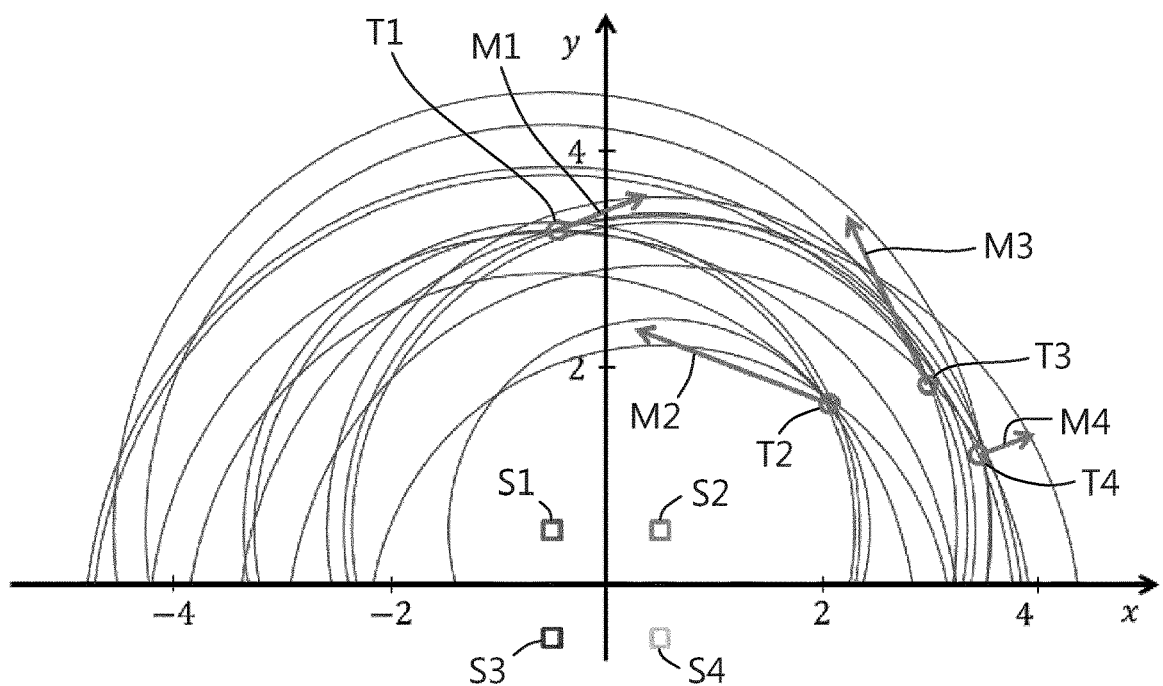
FIG. 13 shows a diagram illustrating an exemplary scene with four radar sensors and the individual range rings caused by four moving targets.

Hereby, FIG. 12 depicts the range-ring intersection density overlaid to FIG. 13. Multiple range rings cross an observation area O around the actual maximum density area D. FIG. 13 depicts an exemplary scene with four radar sensors S1-S4 and the individual range rings caused by four moving targets T1-T4 in consideration of range measurement errors. An arrow M1-M4 on each target's location shows the direction of the movement and the velocity by the arrow-length.

A target detection that is exclusively based on constant false alarm rate (CFAR) or peak detection could lead to an erroneous estimation of a targets position. For a more robust localization of moving targets the proposed algorithm is divided into coarse position estimation, followed by iterative error minimization. The coarse estimation step aims for the selection (S112) of all range rings that probable belong to a single target. This is achieved by the following steps:

a) estimation of the highest intersection point density and
b) evaluation of all range rings, related to the intersection points in the picked area, with respect to the least error of a mapping between the calculated emphasis of the $n_t$ intersection points and the related velocity vectors.

Regarding the first step a), the highest density in the actual density map is evaluated. In a single target scenario with M≥3 sensors, the appropriate grid area at the target position has in any case the highest density, while ambiguous intersection points occur as less dense areas. In multi target scenarios, a single grid cell could consist either of intersection points related to a single target located in that grid area, multiple targets located in that grid area, or combinations of target(s) and ambiguous intersections of targets located in other grid areas.

For the coarse estimation, the highest density grid cell is considered and the distances $$dSi = \sqrt{(Cpos\approx,x + Si,x)^2 + (Cpos\approx,y + Si,y)^2} \quad (1.11)$$

are calculated for every node. An exemplary accumulation grid is depicted in FIG. 14A. Using this coarse estimation $C_{pos\approx}$, all range rings passing nearby are considered for a further evaluation. To limit the number of range-sensor pairs to be evaluated, only range rings passing by within a radius B are retracted:

$$||\overrightarrow{S_i Z_1}| - d_{S_i}| < B. \quad (1.12)$$

Figure 15:
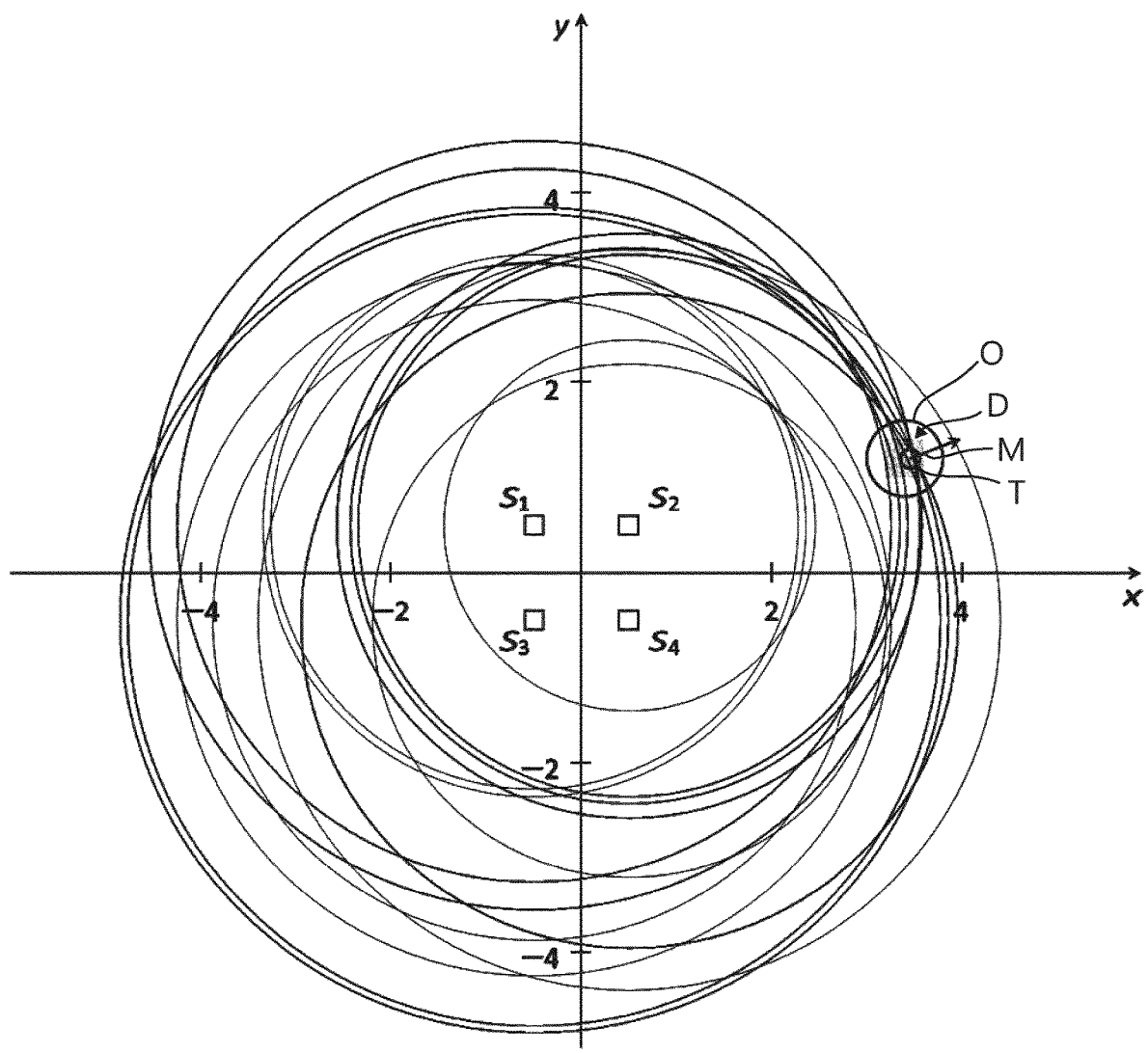
FIG. 15 shows a diagram illustrating an observation area O around an area of high density of intersection points.

This behavior is shown in FIG. 15 for a scenario with four sensors and three targets. The optimal size of B (the radius of the observation area O, e.g. 0.5 m in an example) depends on the spatial arrangement of the sensor nodes, the radar parameters, and the choice of the cell size. $S_i Z_1$ denotes the radial distance between a target $Z_1$ and sensor node $S_i$, i.e. the radius of the corresponding range ring or, in other words, this is the target distance measured at a sensor. $S_i Z_l$ represents all sensor target pairs.

For a too small observation area O (i.e. a too small radius B), not all range rings that belonging to the same target are omitted from further processing stages. A too large radius B leads to a high number of range rings that may be considered whereby the required computation time is increased. An adaptive adjustment of B during the runtime of the algorithm is possible.

Figure 14:
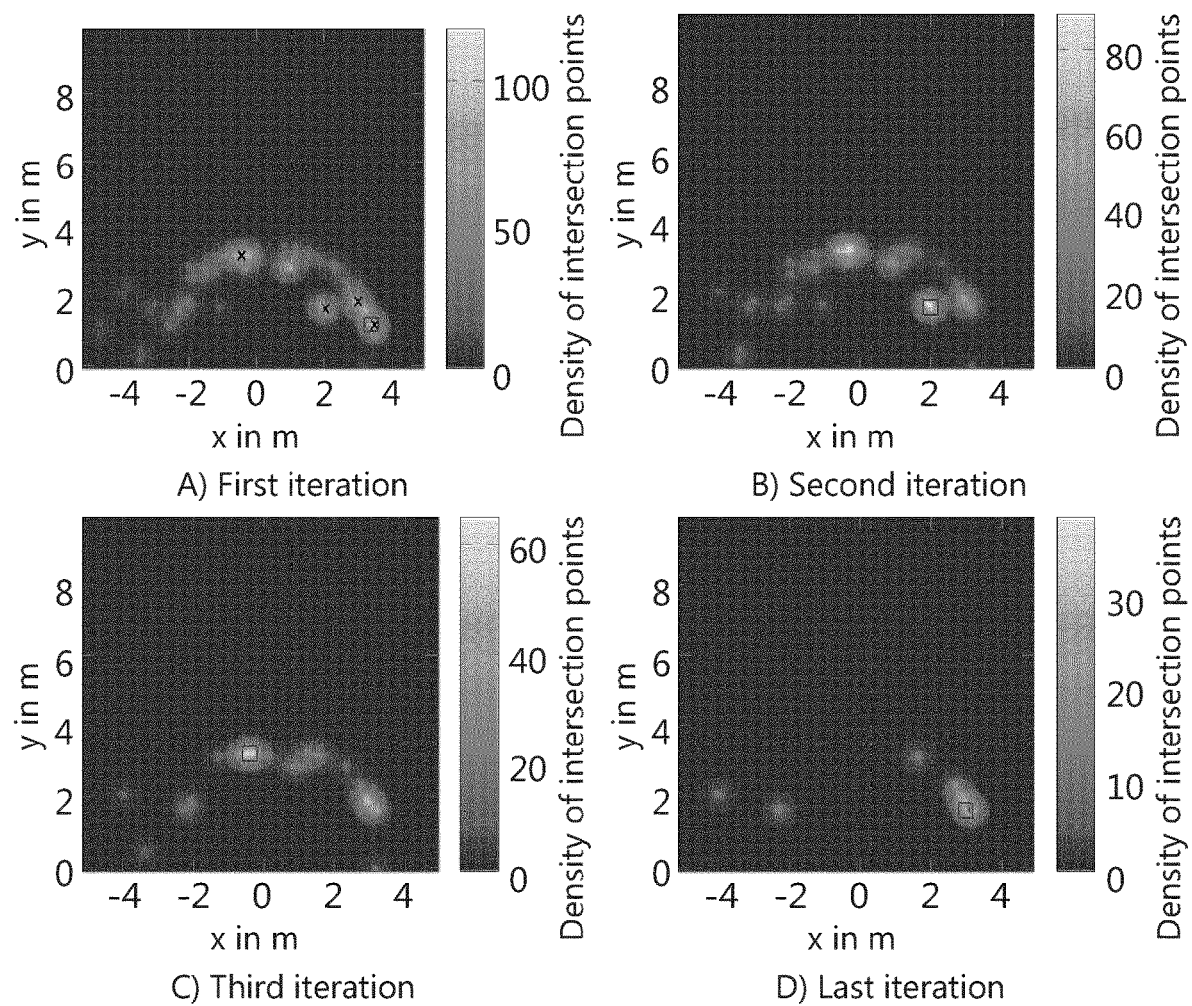
FIG. 14 shows a diagram illustrating four calculated densities of intersection points for each step of the coarse estimation.

The accurate estimation of the target location and velocity is described in the following. After a target is found and the corresponding range ring set was removed, a new coarse estimation step is executed. FIG. 14 shows the four calculated densities of intersection points for each step of the coarse estimation with respect to the scenario depicted in FIG. 13. In particular, FIG. 14 shows the accumulation grids at different consecutive iteration steps with real target positions indicated by crosses (x) and the picked maxima indicated by rectangles (□) for $C_{pos_-}$ in the next iteration step.

Figure 16:
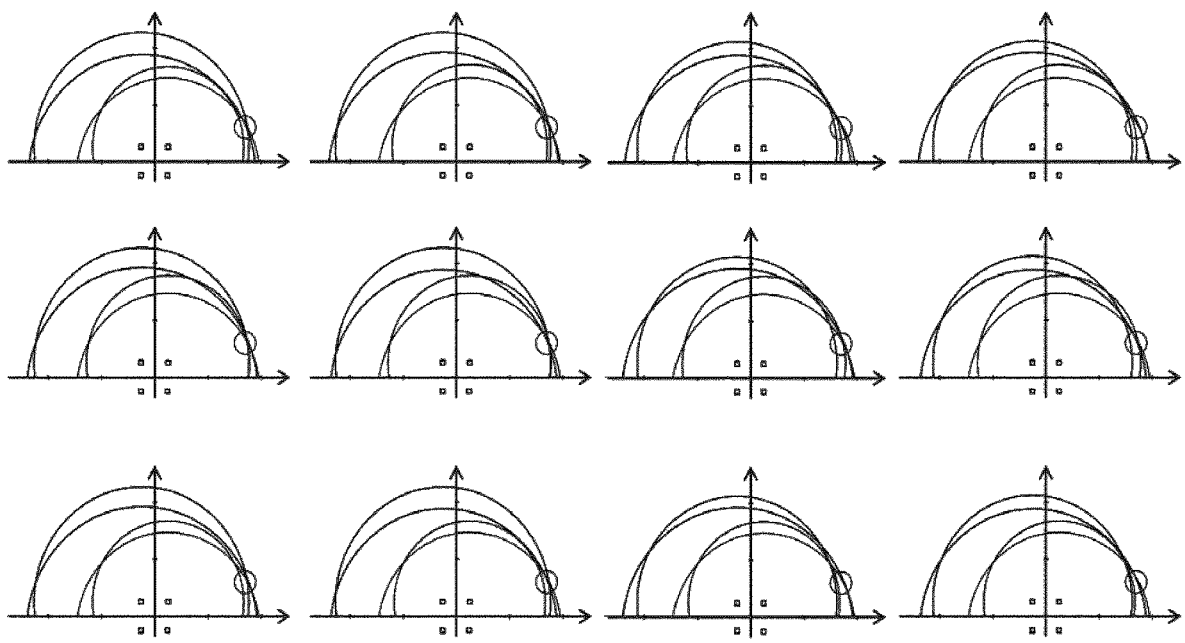
FIG. 16 shows a diagram illustrating multiple combinations of different range rings.

In a next step (S113), a target position is estimated for all combinations of the different range rings, crossing through the circular area with radius B. A subset of the possible combinations is depicted in FIG. 16.

The point with the least squared radial distance to the treated node-range-combinations minimizes the function $$f(X, Y) = \sum_{i=1}^{n} \left( \sqrt{(X - S_{i,x})^2 + (Y - S_{i,y})^2} - |\overrightarrow{S_i Z_1}| \right)^2 \quad (1.13)$$

Hence, this is the most likely target position. The solution of the minimization problem can be found by utilization of the gradient method.

The least squared radial distances are error distances between the estimated target position and the corresponding range measurements of each sensor. (1.13) denotes the corresponding error function. The function denotes the sum of the squared distances between an estimated target position P(X,Y) and the respective range rings of the combination. In other words, the range rings of the measurements need to be increased by this values to intersect at the common point P(X,Y).

Figure 17:
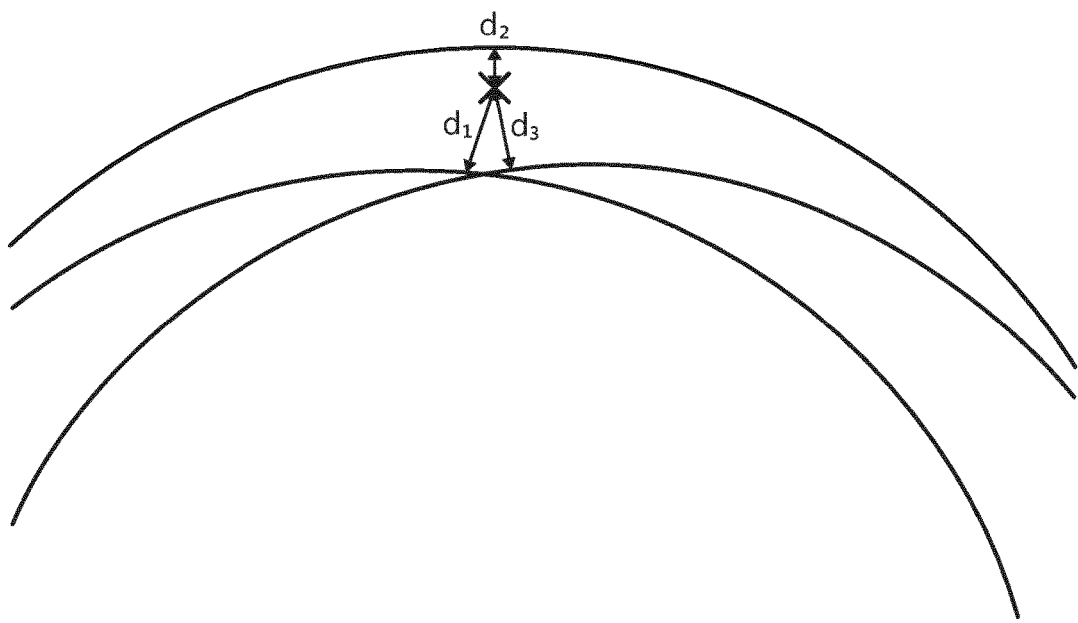
FIG. 17 shows a depiction of measured distances of three sensors as range ring segments and an estimated target position as optimization result.

For each range ring set with n sensors this function is evaluated and the set with the lowest errors is used. FIG. 17 is a depiction of measured distances of three sensors as range ring segments and an estimated target position as optimization result. The differences of the range ring diameters to the estimated target position are depicted by $d_1$, $d_2$, $d_3$. The resulting target estimations are used in a further step to calculate resulting velocities.

As described before, the measurement of each sensor also gives a range and velocity (Doppler) information including the relative direction of motion. The relative velocity between a target and distributed sensors differs (cf. FIG. 6).

In the following, the estimation of a target's velocity and direction of movement (S114) is described in detail. (1.14) denotes a function used to calculate the x and y components of these velocities for a probable target position. (1.15) gives the expected relative velocity which would be measured for a certain target position. The relative velocity of this expectation is also separated into x and y components. This allows the comparison of the expectation and the measurement by an error value that is computed in (1.17).

(1.17) calculates the error between an expected value from (1.16) and the measured velocity. Here, the Euclidean distance is used. This is the square root of the sum of the squared differences between expectation and measurement. Finally, (1.18) denotes the sum of the squared velocity differences of all sensor positions which represent the error function g.

The expected relative velocity a stationary target at a certain angle has can be calculated with the knowledge of the sensor/vehicle movement and the possible target position (e.g. the angle).

In detail, the estimation of a target's velocity and direction of movement (S114) can be done on the basis of suitable estimations of a target's position. The error of the proposed velocity estimation is also used as criterion for choosing a set range rings for a target position. As described above, the target motion $V_z$ on the true target position is composed of the relative velocities $\overrightarrow{V_{rel,Si,Z1}}$ measured by spatially distributed sensors. These velocities can be resolves to x- and y-components with knowledge of the angle $\overrightarrow{\Phi_{\overline{S_iZ}}}$ between the sensor position and the target position P to $$\begin{pmatrix} \overrightarrow{V}_{rel,S_i,Z_1,x} \\ \overrightarrow{V}_{rel,S_i,Z_1,y} \end{pmatrix} = |\overrightarrow{V}_{rel,S_i,Z_1}| \cdot sgn(\ldots)_{S_i,Z_1} \cdot \begin{pmatrix} \cos(\Phi_{\overline{S_iZ}}(P_x, P_y)) \\ \sin(\Phi_{\overline{S_iZ}}(P_x, P_y)) \end{pmatrix}, \quad (1.14)$$

where the sign sgn( . . . )$_{S_i,Z_1}$ denotes if target and sensor are moving away from each other or move towards each other. Vice versa, the relative velocities that correspond to a certain target velocity $|\overrightarrow{V_Z}|$ with the direction of motion $\overrightarrow{\Phi_{\overrightarrow{V}}}$ are directly related to spatial arrangement of the sensors and the target. It can be expressed by $$|\overrightarrow{V}_{rel,S_i,Z_1,Calc.}| \cdot sgn_{Ber.}(\ldots)_{S_i,Z_1} = \cos(\Phi_{\overrightarrow{V}_Z} - \Phi_{\overline{S_iZ}}) \cdot |\overrightarrow{V}_Z| \quad (1.15)$$

where $\overrightarrow{\Phi_{\overrightarrow{V}}}$ denotes the direction of motion of the target. This calculated relative velocity can also be expressed by x- and y-components to $$\begin{pmatrix} \overrightarrow{V}_{rel,S_i,Z_1,x,Calc.} \\ \overrightarrow{V}_{rel,S_i,Z_1,y,Calc.} \end{pmatrix} = \quad (1.16)$$

$$|\overrightarrow{V}_{rel,S_i,Z_1,Ber.}| \cdot sgn_{Ber.}(\ldots)_{S_i,Z_1} \begin{pmatrix} \cos(\Phi_{\overline{S_iZ}}(P_x, P_y)) \\ \sin(\Phi_{\overline{S_iZ}}(P_x, P_y)) \end{pmatrix}.$$

These calculated relative velocities and the measured relative velocities can be compared in Cartesian coordinates by calculation of the velocity deviation $$\Delta v_i = \sqrt{(\overrightarrow{V}_{rel,S_i,Z_1,x} - \overrightarrow{V}_{rel,S_i,Z_1,x,Calc.})^2 + (\overrightarrow{V}_{rel,S_i,Z_1,y} - \overrightarrow{V}_{rel,S_i,Z_1,y,Calc.})^2} \quad (1.17)$$

The summation of the squared errors of all relative velocities leads to the function $$g(|\overrightarrow{V}_Z|, \Phi_{\overrightarrow{V}_Z}) = \sum_{i=1}^{n} (\Delta v_i^2) \quad (1.18)$$

which is minimal for a target velocity $|\overrightarrow{V_Z}|$ and direction of movement $\overrightarrow{\Phi_{\overrightarrow{V}}}$ corresponding to the measured radial velocities.

Figure 18:
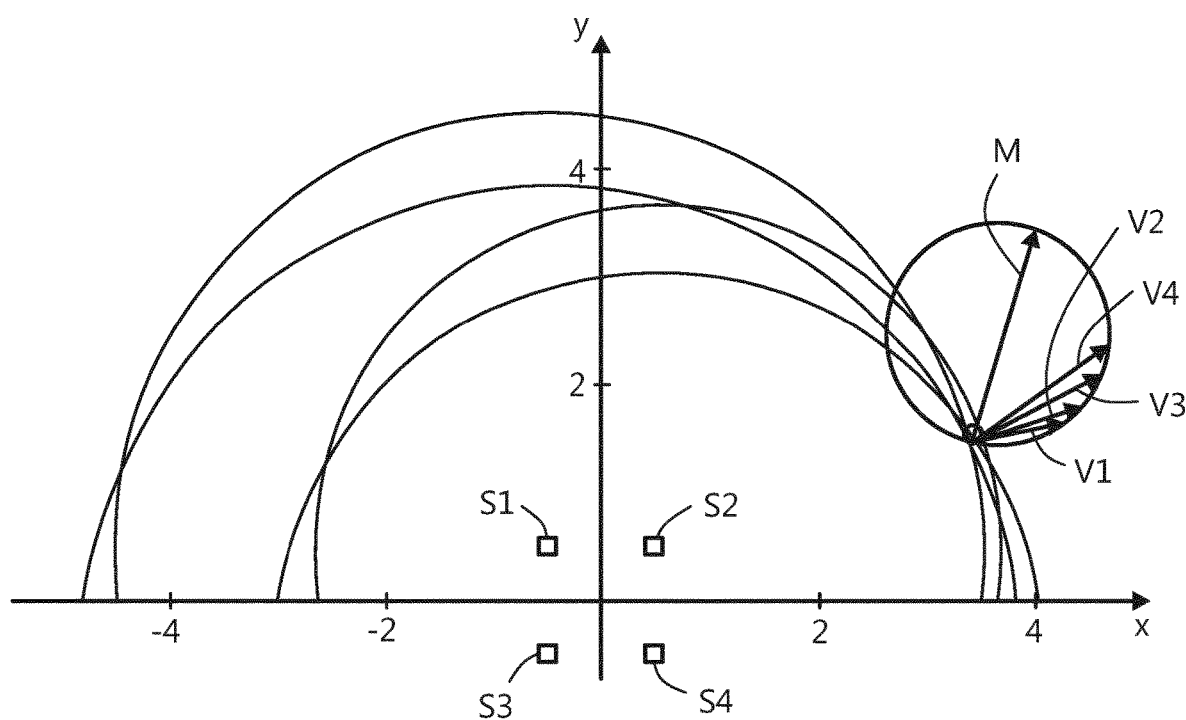
FIG. 18 shows a diagram illustrating the target's actual motion representing the velocity and the direction of movement.

FIG. 18 shows an extension of FIG. 11 showing the target's actual motion M representing the velocity and the direction of movement. The velocities V1-V4 measured by the four sensors are depicted by further arrows.

The previously discussed approach is divided into two parts, first the estimation a possible target position and second the estimation of a matching target movement. In contrast to that, the information provided by the measured relative velocities can also be utilized to improve the estimation of the target position. This is achieved by combining the functions from equations (1.18) and (1.13) to a single function $$h(X, Y, |\vec{V}_Z|, \Phi_{\vec{V}_Z}) = f(X, Y)^2 + g(|\vec{V}_Z|, \Phi_{\vec{V}_Z})^2 \quad (1.19)$$

which expresses a 4-dimensional optimization problem. Normalization with the maximum measured range $S_R$ and the maximum measured velocity $|S_V|$ and adjustment of the weighting with the squared range resolution $\Delta R_{min}^2$ and the squared velocity resolution $\Delta v_r^2$ results in $$h(X, Y, |\vec{V}_Z|, \Phi_{\vec{V}_Z}) = \left(\frac{f(X, Y) \cdot \max(S_R)}{\Delta R_{min}^2}\right)^2 + \left(\frac{g(X, Y, |\vec{V}_Z|, \Phi_{\vec{V}_Z}) \cdot \max(|S_V|)}{\Delta v_r^2}\right)^2 \quad (1.20)$$

The results from equations (1.18) and (1.13) need to be set as seed to solve this multi-modal optimization problem.

Both, the range information and the target information of a measurement can be used to calculate ambiguous target locations. As both are coupled to the target location, combining the error functions from (1.18) and (1.13) to a single function enables simultaneous minimization of errors of range and velocity measurements. This leads to improved target localization.

As depicted in FIG. 8 in the case that no sensor movement is present the estimated velocity directly represents the target movement. On the other hand, the estimated movement represents the movement of the sensors, if only the sensors are moving. If a target movement and a sensor movement are present the estimated velocity represents the superposition of both measurements. Hence, an estimation of the actual target movement is only possible if the sensor movement is known. This information is usually available from wheel speed sensors and inertial measurement units of modern vehicles. The ego motion can also be derived from stationary targets, either by specific stationary targets which are known to be stationary because of their location or because of the common behavior of the estimated movement that is valid for all stationary targets.

The foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. Device for localization of a target in a scene, said device comprising circuitry configured to:
   obtain radar signal measurements simultaneously acquired by two or more radar sensors arranged at different locations, said two or more radar sensors having overlapping fields of view,
   derive range information of one or more potential targets from samples of radar signal measurements of said two or more radar sensors acquired at the same time or during the same time interval, the range information of a single sample representing a ring segment of potential positions of a potential target at a particular range from the respective radar sensor in its field of view,
   determine intersection points of ring segments of the derived range information,
   determine a region of the scene having one of the highest densities of intersection points,
   select a ring segment per sensor that goes through the selected region, and
   determine the most likely target position of the potential target from the derived range information of the selected ring segments.

2. Device as defined in embodiment 1,
   wherein the circuitry is further configured to iteratively determine the most likely target position from different combinations of ring segments, wherein a combination includes one ring segment per sensor that goes through the selected region and each combination comprises one or more ring segments different from one or more ring segments of other combinations.

3. Device as defined in embodiment 2,
   wherein the circuitry is further configured to determine the most likely target position from different combinations of ring segments by finding the position with the least squared radial distance that minimizes a minimization function.

4. Device as defined in embodiment 3,
   wherein the circuitry is further configured to use as minimization function a sum of the squared radial distances between an estimated target position and the respective range rings of the respective combination.

5. Device as defined in any preceding embodiment, wherein the circuitry is further configured to determine the velocity of the potential target.

6. Device as defined in any preceding embodiment, wherein the circuitry is further configured to determine the direction of movement of the potential target.

7. Device as defined in any preceding embodiment, wherein the circuitry is further configured to determine the velocity and/or direction of movement of the potential target by use of the angle between the positions of the sensors and the most likely target position and/or by use of relative velocities measured by the sensors.

8. Device as defined in any preceding embodiment, wherein the circuitry is further configured to determine the velocity and/or direction of movement of the potential target by minimization of a sum of the squared errors of the relative velocities.

9. Device as defined in any preceding embodiment, wherein the circuitry is further configured to use relative velocities measured by the sensors for improving the determination of the most likely target position.

10. Radar system comprising
two or more radar sensors arranged at different locations and having overlapping fields of view from a scene, said radar sensor being configured to simultaneously acquire radar signal measurements from the scene including one or more targets, and
a device as in any one of embodiments 1-9 for localization of a target in the scene based on the acquired radar signal measurements.

11. Method for localization of a target in a scene, said method comprising:
obtaining radar signal measurements simultaneously acquired by two or more radar sensors arranged at different locations, said two or more radar sensor having overlapping fields of view,
deriving range information of one or more potential targets from samples of radar signal measurements of said two or more radar sensors acquired at the same time or during the same time interval, the range information of a single sample representing a ring segment of potential positions of a potential target at a particular range from the respective radar sensor in its field of view,
determining intersection points of ring segments of the derived range information,
determine a region of the scene having one of the highest densities of intersection points,
selecting a ring segment per sensor that goes through the selected region, and
determining the most likely target position of the potential target from the derived range information of the selected ring segments.

12. A non-transitory computer-readable recording medium that stores therein a computer program product, which, when executed by a processor, causes the method according to embodiment 11 to be performed.

13. A computer program comprising program code means for causing a computer to perform the steps of said method according to embodiment 11 when said computer program is carried out on a computer.

The invention claimed is:

1. A device for localization of a target in a scene, the device comprising:
circuitry configured to:
obtain radar signal measurements acquired by two or more radar sensors arranged at different locations, the two or more radar sensors having overlapping fields of view;
derive range information of one or more potential targets from samples of the radar signal measurements which are simultaneously acquired or acquired during a same time interval, wherein the range information of a single sample represents a ring segment of potential positions of a potential target at a particular range from a respective radar sensor and in a field of view of the respective radar sensor;
determine intersection points of ring segments of the range information;
determine a first region of the scene having a density of intersection points higher than other regions in the scene;
identify all ring segments crossing through a confidence region which surrounds the first region;
select, from the identified ring segments, a ring segment per sensor that goes through the first region; and then
determine a most likely target position of the potential target from the range information of the ring segment selected for each sensor.

2. The device as claimed in claim 1, wherein the circuitry is further configured to iteratively determine the most likely target position from different combinations of ring segments.

3. The device as claimed in claim 2, wherein the circuitry is further configured to determine the most likely target position from different combinations of ring segments by finding a position with a least squared radial distance that minimizes a minimization function.

4. The device as claimed in claim 3, wherein the circuitry is further configured to use as the minimization function a sum of squared radial distances between an estimated target position and respective range rings of a respective combination.

5. The device as claimed in claim 1, wherein the circuitry is further configured to determine a velocity of the potential target.

6. The device as claimed in claim 1, wherein the circuitry is further configured to determine a direction of movement of the potential target.

7. The device as claimed in claim 1, wherein the circuitry is further configured to determine a velocity and/or a direction of movement of the potential target using an angle between positions of the sensors and the most likely target position and/or using relative velocities measured by the sensors.

8. The device as claimed in claim 1, wherein the circuitry is further configured to determine a velocity and/or a direction of movement of the potential target by minimization of a sum of squared errors of relative velocities.

9. The device as claimed in claim 1, wherein the circuitry is further configured to use relative velocities measured by the sensors to improve determination of the most likely target position.

10. A radar system, comprising:
the device as claimed in claim 1; and
the two or more radar sensors arranged at the different locations and having the overlapping fields of view, wherein the two or more radar sensors are configured to acquire radar signal measurements from the scene including one or more targets.

11. A method for localization of a target in a scene, the method comprising:

obtaining radar signal measurements acquired by two or more radar sensors arranged at different locations, the two or more radar sensor having overlapping fields of view of the scene;

deriving range information of one or more potential targets from samples of the radar signal measurements which are simultaneously acquired or acquired during a same time interval, wherein the range information of a single sample represents a ring segment of potential positions of a potential target at a particular range from a respective radar sensor and in a field of view of the respective sensor;

determining intersection points of ring segments of the range information;

determine a first region of the scene having a density of intersection points higher than other regions in the scene;

identifying all ring segments crossing through a confidence region which surrounds the first region;

selecting, form the identified ring segments, a ring segment per sensor that goes through the first region; and then determining a most likely target position of the potential target from the range information of the ring segment selected from each sensor.

12. The method as claimed in claim 11, further comprising:

iteratively determining the most likely target position from different combinations of ring segments.

13. The method as claimed in claim 12, further comprising determining the most likely target position from different combinations of ring segments by finding a position with a least squared radial distance that minimizes a minimization function.

14. The method as claimed in claim 13, further comprising using as the minimization function a sum of squared radial distances between an estimated target position and respective range rings of a respective combination.

15. The method as claimed in claim 11, further comprising determining a velocity of the potential target.

16. The method as claimed in claim 11, further comprising determining a direction of movement of the potential target.

17. The method as claimed in claim 11, further comprising determining a velocity and/or a direction of movement of the potential target using an angle between positions of the sensors and the most likely target position and/or using relative velocities measured by the sensors.

18. The method as claimed in claim 11, further comprising determining a velocity and/or a direction of movement of the potential target by minimization of a sum of squared errors of relative velocities.

19. The method as claimed in claim 11, further comprising using relative velocities measured by the sensors to improve determination of the most likely target position.

* * * * *